Nov. 6, 1945.  E. KOMENDA  2,388,419
VEHICLE BODY CONSTRUCTION
Filed Nov. 26, 1938
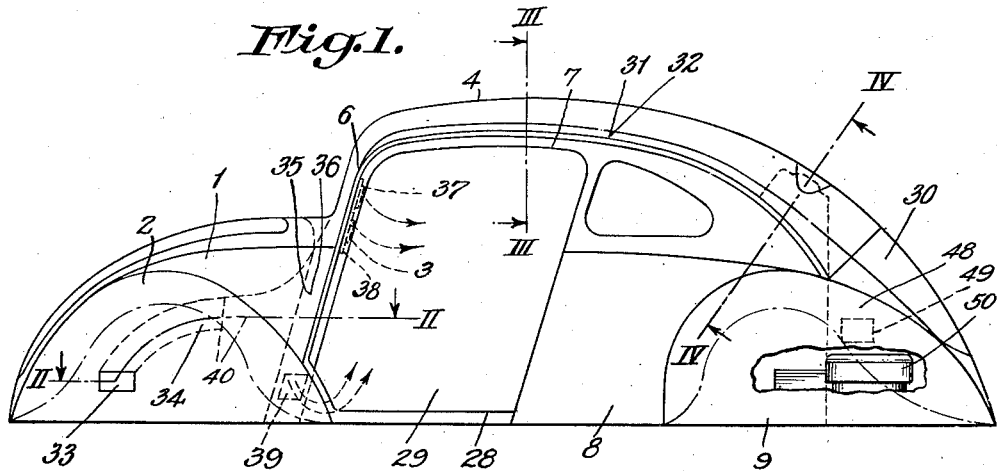
Fig. 1.
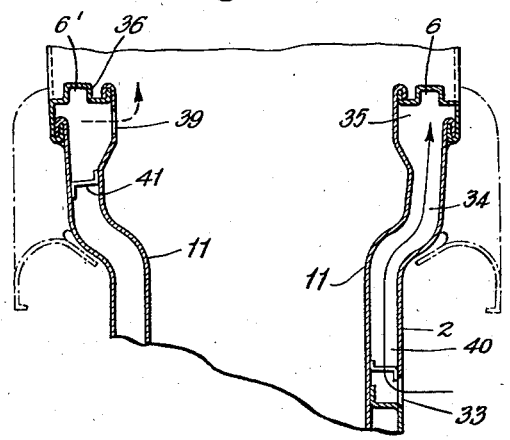
Fig. 2.
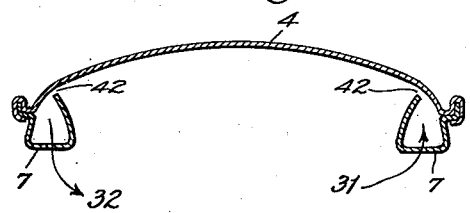
Fig. 3.
Fig. 5.
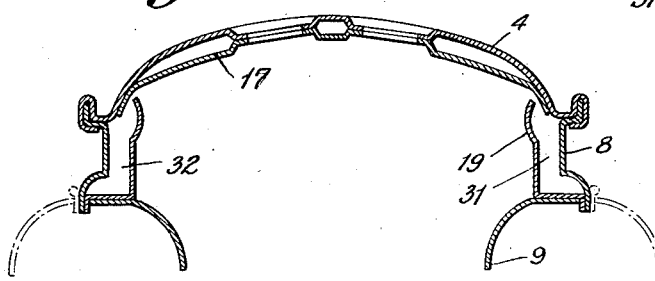
Fig. 4.
Inventor
Erwin Komenda.
By [signature]
Attorney.

Patented Nov. 6, 1945

2,388,419

UNITED STATES PATENT OFFICE 2,388,419

VEHICLE BODY CONSTRUCTION

Erwin Komenda, Stuttgart-Korntal, Germany; vested in the Alien Property Custodian Application November 26, 1938, Serial No. 242,526
In Germany November 30, 1937

16 Claims. (Cl. 98—2)

This invention relates to an improved vehicle body construction and more particularly to a vehicle body formed with integral air ducts for cooling and/or heating various vehicle parts.

An object of this invention is to provide a vehicle body containing air cooling and/or heating ducts formed as an integral part of the body construction.

Another object of this invention is to provide air cooling and/or heating ducts for a vehicle body, formed with a minimum of added parts.

Still another object of this invention is the provision of a vehicle body made of individual interconnected sheet metal members which, at the same time, form air cooling and/or heating ducts.

An object of this invention is the provision of air cooling and/or heating ducts for the engine, passenger compartment, or windshield of a sheet metal vehicle body, formed from the hollow spaces already present in such a body.

A more specific object of this invention is the provision of air cooling and/or heating ducts for the engine, passenger compartment, and windshield of a vehicle body formed from the hollow spaces within the body walls, windshield posts and roof rails of such a body, preferably made from interconnected sheet metal parts.

Other objects and advantages of this invention will be apparent from the description of a single preferred embodiment thereof taken in connection with the attached drawing, wherein:

Fig. 1 is a side view of a vehicle body formed in accordance with the principles of this invention;

Fig. 2 is a transverse cross-sectional view along the line II—II of Fig. 1;

Fig. 3 is the half of a transverse cross-sectional view along the line III—III of Fig. 1;

Fig. 4 is the half of a transverse cross-sectional view along the line IV—IV of Fig. 1; and Fig. 5 is a transverse cross-sectional view of part of the construction shown in Fig. 3, drawn upon an enlarged scale to emphasize certain features of my construction.

The principles of this invention are illustrated generally in Fig. 1 as applied to an automobile of the type having its engine in the rear. The vehicle body is illustrated as being formed of a front apron 1 having a wheel insert 2 and interconnected with a roof portion 4. Windshield posts 6 are provided at the front edge of the roof 4 and the roof is itself supported by roof rails 7. The latter extend rearwardly into the side walls 8 which are formed with rear wheel inserts 9. The body is supplied with the usual floor board 28 forming with the interior of the body the passenger space 29. The engine space at the rear of the body has been indicated at 30.

It is to be understood that preferably all of the body elements are formed from sheet metal and, more specifically, in accordance with the teachings of my co-pending application Serial Number 236,633, filed October 24, 1938. The principles of my construction are not, however, limited in their application to this specific type of body which has been used merely by way of illustration.

The body arrangement described above adapts itself admirably to the formation of integral hollow ducts extending longitudinally of the vehicle for carrying fresh or cooling air to the passenger compartment or engine, or for carrying heated air from the engine compartment to the interior of the vehicle or to openings directed against the windshield. As best shown in Fig. 2, taken in connection with Fig. 1, I prefer that the fresh air be drawn in through a suitable opening in the side of the vehicle, such as the opening 33 positioned in the wheel insert 2. An opening so positioned is subjected to a certain amount of natural air pressure, developed when the vehicle is traveling, which will tend to blow the air through the ducts to the positions desired. For guiding the entering air, duct 34 is first readily formed between the hollow portions existing by the arrangement of the apron 1 and the interior strengthening leaf 11. The boundaries of the duct may be completed by insertion of small transverse leaves, such as 40.

Extending rearwardly, the duct 34 merges into the duct 35 which is formed by the hollow space bounded by the apron 1, the windshield post 6, the strengthening leaf 11, and the transverse leaf 40.

The duct 35 will then extend upwardly through the hollow windshield post 6 and will there merge into the connecting duct 31.

As best illustrated in Fig. 3, the duct 31 is formed from the natural hollow space existing between the roof 4 and the sheet metal roof rail 7. No additional parts are necessary to form this passage.

Toward the rear of the vehicle where the roof rail extends into the sheet metal side walls 8, the duct 31 is formed by the hollow space bounded on opposite sides and at the bottom by the outside wall itself and the inner lining 19, as shown in Fig. 4. The top of the duct at this point consists of the transverse roof strengthening member 17. At this rear portion of the vehicle the duct 31 will communicate with the rear engine space 30, and there may be arranged in any suitable manner so as to guide cooling air to the engine 50. It will thus be seen that the various hollow spaces 34, 35, and 31 will form a continuous air conducting duct from the front of the vehicle back to the rear engine.

If it is desired to provide heated air to the passenger compartment or to play upon the windshield to prevent the formation of frost or ice, a similar duct 32 extending forwardly from the rear of the vehicle may be provided. This duct can be formed by the connection of the roof, roof rails, and side walls similarly to the duct 31. As shown in Fig. 1 and the left hand portion of Fig. 2, the duct 32 will connect with a duct 36 formed in the other windshield post by the apron 1, the strengthening leaf 11, the windshield post 6', and the transverse member 41. At the lower end of the windshield 6' preferably in the vicinity of the floor board 28, a suitable opening 39 may be provided through which the heated air may pass into the interior of the vehicle. At the position of the windshield, slits 37 may be provided in the windshield post 6' for properly directing the heated air against the windshield. Obviously, cool air could be similarly directed through slits 37 or opening 39 in the post 6, and in Fig. 1, the direction of the cooling air has been indicated by the arrow in solid lines while the direction of the heated air has been indicated by the arrow in dotted lines.

The manner in which the air may be heated at the rear of the vehicle is of unimportance with regard to this invention but it may be done in any of several manners known to the art. For example, the air may obtain its heat from the engine exhaust, from the hot engine cooling water, or by some separate air heating device which may be regulated to control the temperature of the air supplied. By way of example, and particularly to illustrate a suitable location, a separate air heating device 49 is diagrammatically shown in Fig. 1. Heated air therefrom enters the duct 32 through a suitable connection as at 48. Suitable air filtering means (not shown) may also be used for both the cooling and heated air.

Since the cooling or heating air is liable to contain moisture or other ingredients which may affect and rust the interior of the ducts, it is advisable that these be so formed that they are accessible for cleaning or covering by paint. To that end, the ducts may be preferably formed with small slits indicated in Fig. 3 as 42, in Fig. 4 as 43, and still more clearly shown in Fig. 5. By means of a special device the ducts may be cleaned or sprayed through these slits or, if the body is painted by the dipping method, the slits permit entry and withdrawal of the paint from the ducts. After the painting operation has been performed, I prefer to cover these ducts with suitable compressible means indicated at 44, such as soft rubber, artificial resinous material, or felt. This material may be in the form of pads which at certain places within the vehicle body can advantageously cover the edges 45 of the interior decorative covering 46. The parts will press against the edges and thus tend to hold them in place by a clamping action.

While in the form of invention illustrated and described above only two ducts have been shown, it is obvious that others formed in accordance with the principles of this construction may be utilized, if desired. Variations in the duct system are also apparent.

Accordingly, I do not intend that the scope of this invention be limited to the exact features shown and described, but only as may be required by the claims which follow.

I claim:

1. In a vehicle body, in combination, a sheet-metal roof for said vehicle, a sheet-metal member interconnected with said roof to form a closed hollow longitudinal roof rail, means for connecting one end of the interior of said rail to the outside air near one end of the body, means for the connecting of the other end of the interior of said rail to form an outlet within the body, said rail is formed with a small slit between the sheet-metal member and the inside of said roof, and removable compressible means mounted for closing said slit while providing access to the interior of said rail.

2. In a vehicle body, in combination, a sheet-metal roof for said body, a sheet-metal member interconnected with said roof to form a hollow roof rail extending along the greater part of the length of said roof, a forward vertical sheet-metal windshield post, a forward sheet-metal apron, a forward sheet-metal strengthening member inside of said apron, a sheet-metal connecting leaf, said windshield post, apron and strengthening and connecting leaves being so interconnected as to form between them a hollow canal communicating with the interior of the roof rail to form a continuous air duct, and air inlet and outlet means connected to said duct.

3. In a vehicle, in combination, a sheet-metal roof for said body, a sheet-metal member interconnected with said roof to form a hollow roof rail extending along the greater part of the length of said roof, a sheet-metal rear outside panel for said body interconnected with said roof, a transverse body member mounted beneath said roof, a lining panel interconnected between said transverse member and said outside panel, said outside panel, roof, transverse member and lining panel forming between them a hollow canal communicating with the interior of the roof rail to form a continuous air duct, and air inlet and outlet means connected to said duct.

4. In a vehicle body, in combination, a sheet-metal roof for said body, a sheet-metal member interconnected with said roof to form a hollow roof rail extending along the greater part of the length of said roof, a forward sheet-metal windshield post, a forward sheet-metal apron, a forward sheet-metal strengthening member inside of said apron, a sheet-metal interconnecting leaf, said windshield post, apron, and strengthening and interconnecting leaves being so interconnected as to form between them a first hollow canal communicating with the interior of the roof rail, a sheet-metal rear outside panel for said body interconnected with said roof, a body member mounted beneath said roof, a lining panel interconnected between said transverse member and said outside panel, said outside panel, roof transverse member and lining panel forming between them a second hollow canal communicating with the interior of said roof rail to form with it and said first hollow canal a continuous air duct, and air inlet and outlet means connected to said duct.

5. The combination according to claim 2 in which said apron is formed with a front wheel insert, and the air inlet means is open to the outside air at said wheel insert.

6. The combination according to claim 4 in which said apron is formed with a wheel insert, in combination with a third hollow canal communicating with said first hollow canal and formed by said apron, and strengthening and interconnecting leaves, the air inlet means connecting said third canal to the outside air at said wheel insert.

7. The combination according to claim 2 in which said air outlet means is in the form of an opening in said windshield post communicating with the interior of the vehicle.

8. The combination according to claim 2, in combination with a windshield for said vehicle, and in which said air outlet means is in the form of one or more slits in said windshield posts for directing air against the inside of said windshield.

9. The combination according to claim 2, in combination with a windshield for said vehicle, and in which said air outlet means is in the form of a plurality of openings in said windshield post, one of said openings communicating with the interior of said vehicle and the other positioned to direct air against said windshield.

10. The combination according to claim 4, in combination with a floor board for said vehicle, and in which said air outlet means is in the form of an opening in said windshield post communicating with the interior of the vehicle at substantially the height of the floor board.

11. The combination according to claim 4, in combination with a windshield for said vehicle, and in which said air outlet means is in the form of one or more slits in said windshield posts for directing air against the inside of said windshield.

12. The combination according to claim 4, in combination with a windshield and floor board for said vehicle, and in which said air outlet means is in the form of a plurality of openings in said windshield post, one of said openings communicating with the interior of said vehicle at substantially the height of the floor board, and the other positioned to direct air against said windshield.

13. The combination according to claim 2 in which said duct is formed with a small slit, and removable means mounted for closing said slit.

14. The combination according to claim 3 in which said duct is formed with a small slit, and removable means mounted for closing said slit.

15. The combination according to claim 4 in which said duct is formed with a small slit, and removable means mounted for closing said slit.

16. In a vehicle body made of a plurality of interconnected sheet-metal parts having interconnecting hollow slitted openings therein to form a continuous duct extending substantially the length of the body, a covering on said parts for the interior of the vehicle, and a removable pad of compressable material closing said slits and lying over the edges of said covering, for holding said cover in place and providing access to the interior of said duct.

ERWIN KOMENDA.